Aug. 9, 1966 C. W. BAYLISS 3,264,783
COLLAPSIBLE AND ADJUSTABLE TRELLIS
Filed March 10, 1964

Carl W. Bayliss
INVENTOR.

BY
Agent

United States Patent Office 3,264,783
Patented August 9, 1966

3,264,783
COLLAPSIBLE AND ADJUSTABLE TRELLIS
Carl W. Bayliss, 1089 Oxford SE., Salem, Oreg.
Filed Mar. 10, 1964, Ser. No. 350,816
4 Claims. (Cl. 47—45)

This invention relates to supports for ornamental plants and the like, and more particularly to a novel trellis type support for such plants.

It is the principal object of the present invention to provide a trellis composed of a plurality of separable components capable of disassembly and collapsing to minimum size for convenient storage and capable of assembly into a unitary trellis structure of variable height and diameter to accommodate plants of differing sizes.

Another important object of this invention is the provision of a trellis of a class described which is capable of use in outdoor gardens as well as with individual plants contained in pots, vases or other containers.

A further important object of this invention is the provision of a trellis of the class described which is of simplified construction for economical manufacture, which is capable of assembly and disassembly with speed and facility, and which is capable of assembly into a sturdy unitary structure.

The foregoing and other objects and advantages of the present invention will appear from the following detailed description, taken in connection with the accompanying drawing in which.

Figure 2:
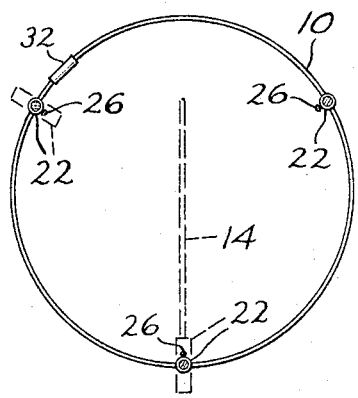
FIG. 2 is a sectional view taken along the line 2—2 in FIG. 1, components being shown in phantom lines in alternate collapsed conditions.

In its broad concept, the trellis of the present invention includes a plurality of vertically spaced horizontal rings, preferably of successively increased diameter, detachably interconnected by a plurality of elongated legs.

In the embodiment illustrated in the drawing, there are three such rings the diameters of which increase upwardly from the lowermost ring. The upper ring 10 and intermediate ring 12 are spaced apart vertically by the circumferentially spaced upper spacer legs 14, and the intermediate ring 12 and lower ring 16 are spaced apart vertically by the lower spacer legs 18. The lower ring 16 is supported vertically above the ground or other supporting base by the elongated supporting legs 20.

Although the rings and legs may be made of synthetic plastic or other suitably rigid material, it is preferred to use steel rod or tubing material.

Figure 3:
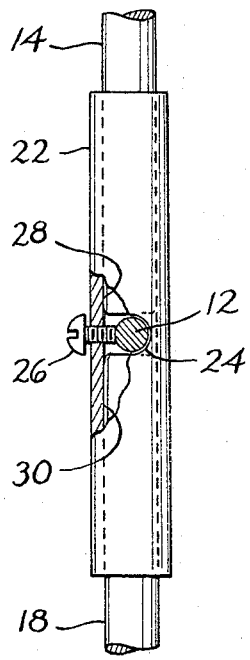
FIG. 3 is a fragmentary sectional view taken along the line 3—3 in FIG. 1.
Figure 1:
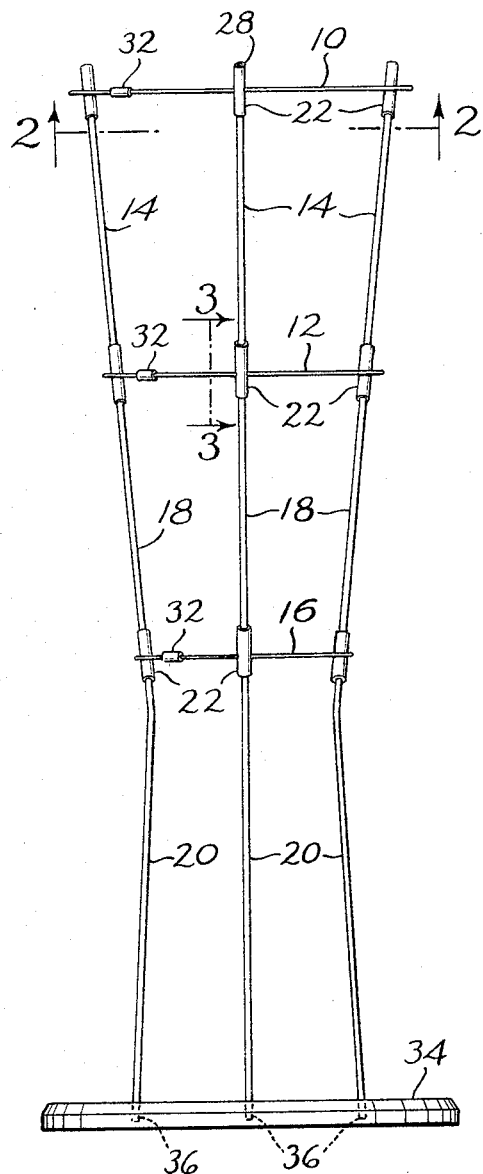
FIG. 1 is a view in side elevation of a trellis embodying the features of the present invention.

Means is provided for detachably connecting the legs to the rings. In the embodiment illustrated, this means is provided by elongated socket members, each of which is formed of a short length of substantially rigid tubing 22. Intermediate the ends of the tubing, preferably centrally thereof, is a transverse opening 24 (FIG. 3) dimensioned to slidably receive the ring therethrough. The tubing thus is free to rotate about the ring, on the axis of the opening, and to slide along the ring.

The socket members may be retained freely on the rings, or they may be secured permanently thereto, as by welding. In the preferred embodiment illustrated a set screw 26 or other suitable locking means is provided for securing each socket member releasably to the ring in a desired position of adjustment. To this end the set screw is received in a tapped opening aligned with but extending substantially normal to the axis of the transverse opening.

It is to be noted that the ring extending through the transverse opening 24 in the tubing forms the bottom or inner end of a pair of opposed sockets 28 and 30 which are open at the opposite ends of the tubing. Each socket thus may receive one end of a leg, with the latter resting in abutment with the ring at the inner end of the socket.

In order to install the socket members on the rings, the latter must initially be split so that the desired number of socket members may be threaded onto the ring from one of its free ends. Thereafter the abutting ends of the split ring are secured together to enhance the structural rigidity of the ring. Although the ring may be closed by various means, such as by welding, it is preferred that the closure be easily removable, to facilitate replacement of the socket members. In the embodiment illustrated, such a removable closure is provided by the short length of plastic, rubber, or other suitably flexible tubing 32 dimensioned to slip over the ends of the split ring and to be retained frictionally thereon, bridging the abutting ends of the ring.

With the socket members thus installed upon the rings, and preliminary to the installation of the legs in the sockets, the socket members are spaced apart around each ring in approximately uniform relation, with the set screws loosened. This permits the socket members to rotate on the axis of the transverse openings 24 and to slide along the rings, whereby to adjust automatically for aligning the sockets with the legs.

The interconnecting spacer legs then are inserted at their opposite ends into the facing sockets. Thus, for example, the upper ends of the upper spacer legs 14 are fitted into the downwardly projecting sockets 30 of the socket members on the upper ring 10, and the lower ends of the upper spacer legs are fitted into the upwardly projecting sockets 28 of the socket members on the intermediate ring 12. In similar manner, the upper ends of the lower spacer legs 18 are fitted into the downwardly projecting sockets 30 of the socket members on the intermediate ring 12 and the lower ends of the lower spacer legs are fitted into the upwardly projecting sockets 28 of the socket members on the lower ring 16. The upper ends of the supporting legs 20 are fitted into the downwardly projecting sockets 30 of the socket members on the lower ring 16.

After the legs and rings have thus been assembled, the socket members are adjusted circumferentially to properly align each vertical row of legs, whereupon the set screws 26 may be tightened to secure the assembly together as a substantially rigid, unitary structure.

As mentioned previously, the trellis may be used out of doors in a garden. In such instance the lower ends of the supporting legs 20 simply are pushed into the ground to a depth adequate to provide a firm support for the trellis, with the plant to be supported being confined within the horizontal rings and vertical legs.

In the embodiment illustrated in the drawing a base plate 34 is provided with a plurality of sockets 36 in its upper surface, arranged to correspond with the spacings of the lower ends of the legs 20 and adapted to receive the latter. The trellis thus is supported in upstanding position on the base plate, the latter also serving to support a potted plant within the confines of the rings and legs.

Alternatively, the base plate 34 illustrated may constitute the bottom of a vase or other suitable receptacle in which plants or flowers are to be supported for display.

In the embodiment illustrated the supporting legs 20 are bent to diverge downwardly from the lower ring 16, to provide increased stability for the trellis, and the rings increase in diameter progressively upward to accommodate the upward spreading normally characterizing a plant or floral arrangement. It will be understood that various other configurations of shape and size may be provided as desired.

As a plant supported within the trellis continues to grow in height, additional rings and legs may be added above the upper ring 10. In the same manner the number of rings and interconnecting legs required for an initial assembly may be chosen in accordance with the size of the plant to be supported.

Disassembly of the trellis is accomplished simply by separating the legs from the socket members. Thereafter, if desired, the set screws 26 may be retained in the set position, and the rings stacked one within another. The disassembled components of stacked rings and cluster of legs thus form a compact package for storage in a minimum of space.

Alternatively, the set screws may be loosened and the socket members rotated into the plane of the supporting ring, as illustrated by the socket member shown in dotted lines in FIG. 2. As a further alternative, the legs may be retained at one end in the associated socket members thus rotated. For example, the upper legs 14 may be retained in the socket members in the upper ring 10 and the lower spacer 18 may be retained in the sockets of the socket members on the intermediate ring 12, as illustrated by the leg shown in dash lines in FIG. 2.

Although the embodiment illustrated utilizes circular rings each supporting a group of three socket members for association with a group of three legs, the rings may be of various shapes each supporting any desired additional number of socket members.

It will be apparent to those skilled in the art that various other changes in structural details, number and size and arrangement of parts, may be made without departing from the spirit of this invention and the scope of the appended claims.

Having now described my invention and the manner in which it may be used, what I claim as new and desire to secure by Letters Patent is:

1. A trellis comprising,
   (a) a plurality of ring members adapted to be arranged in substantially horizontal, vertically spaced position,
   (b) a plurality of socket members on each ring member,
   (c) each socket member having therein a pair of oppositely facing sockets each having an inner leg-abutting end and one aligned with and facing a socket in a socket member on the next adjacent ring member,
   (d) the socket members on the lowermost ring member also having sockets therein facing downward,
   (e) a plurality of elongated spacer leg members receivable freely at their opposite ends in the facing sockets of adjacent ring members, and
   (f) a plurality of elongated supporting leg members receivable freely at their upper ends in the downward facing sockets on the lowermost ring member.

2. The trellis of claim 1 wherein each socket member comprises a tubular member having an intermediate transverse opening freely receiving the associated ring member therethrough for moving the tubular member relative to the ring member, the portion of the ring member traversing the inner bore of the tubular member forming the leg-abutting inner ends of the oppositely facing sockets.

3. The trellis of claim 1 wherein each socket member comprises a tubular member having an intermediate transverse opening freely receiving the associated ring member therethrough for moving the tubular member rotationally and longitudinally relative to the ring member, the portion of the ring member traversing the inner bore of the tubular member forming the leg-abutting inner ends of the oppositely facing sockets.

4. A trellis comprising
   (a) a plurality of ring members adapted to be arranged in substantially horizontal, vertically spaced position,
   (b) a plurality of socket members on each ring member mounted for movement along the ring member and for rotation about the ring member,
   (c) each socket member comprising a tubular member having an intermediate transverse opening freely receiving the associated ring member therethrough for moving the tubular member rotationally and longitudinally relative to the ring member, the portion of the ring member traversing the inner bore of the tubular member dividing the bore into a pair of oppositely facing sockets and forming leg-abutting inner ends for said sockets, one socket of each socket member being adapted to be faced toward and aligned with a socket in a socket member on the next adjacent ring member,
   (d) the socket members on the lowermost ring member also having sockets therein facing downward,
   (e) a plurality of elongated spacer leg members receivable freely at their opposite ends in the facing sockets of adjacent ring members, and
   (f) a plurality of elongated supporting leg members receivable freely at their upper ends in the downward facing sockets on the lowermost ring member.

References Cited by the Examiner

UNITED STATES PATENTS

| | | |
|---|---|---|
| 258,457 | 5/1882 | Melvin. |
| 863,620 | 8/1907 | Martens _____ 47—45 |
| 1,206,770 | 11/1916 | Adams _____ 108—111 |
| 1,560,404 | 11/1925 | Brown. |

FOREIGN PATENTS 593,951  10/1947  Great Britain.

ABRAHAM G. STONE, *Primary Examiner.*

WILLIAM A. SMITH III, *Examiner.*